3,557,039
Patented Jan. 19, 1971

1

3,557,039
AQUEOUS DISPERSION OF BLOCK OR GRAFT POLYMER USEFUL IN SURFACE MODIFYING TREATMENT OF POLYESTER SHAPED ARTICLES
James Eric McIntyre and Michael Mundie Robertson, Harrogate, England, assignors to Imperial Chemical Industries Limited, London, England, a corporation of Great Britain
No Drawing. Original application May 25, 1964, Ser. No. 370,068, Patent No. 3,416,952, dated Dec. 17, 1968. Divided and this application Dec. 2, 1968, Ser. No. 780,589
Claims priority, application Great Britain, June 5, 1963, 22,323/63
Int. Cl. C08g 17/06, 51/24
U.S. Cl. 260—29.2
1 Claim

ABSTRACT OF THE DISCLOSURE

A stable dispersion in water of a block or graft copolymer, a first polymeric constituent of which is a crystalline polyester and a second polymeric constituent of which is solvated by water. The first polymeric constituent contains repeat units of the type used in fiber-forming polyester materials and the second polymeric constituent preferably is a polyoxyethylene chain. The dispersion is useful for applying the polymer to the surface of a polyester article to produce a durable surface effect.

---

This is a division of U.S. application 370,068 filed May 25, 1964 now U.S. Pat. No. 3,416,952, the disclosure of which is incorporated herein by reference.

The present invention relates to a composition useful for a surface-modifying treatment of shaped articles, such as filaments, fibers, fabrics, films and the like, made from synthetic crystallizable polyesters.

Surface treatment of shaped articles made from essentially linear crystallizable polyesters with agents for modifying the properties of the articles, particularly antistatic agents, is well known. There are in general two ways in which such treatment has been carried out: either the agent is permanently attached to the surface by newly-formed covalent bonds, as in the case of radical grafting, certain isocyanate treatments, or the base or acid-catalyzed treatments such as those described in U.S. application of Sheard, Ser. No. 333,995 filed Dec. 27, 1963 and U.S. application of McIntyre et al. Ser. No. 356,942 filed Apr. 2, 1964, both now abandoned, or the agent is loosely held by polar or surface tension forces or other relatively low energy forces. Polyesters, because of their relatively non-polar nature, do not develop very high forces with agents for surface-treatment in this second way; consequently it has proved difficult to carry out a surface treatment of polyesters to obtain an effect which is permanent and very resistant toward washing, scouring, dry-cleaning, and other processes to which the derived articles may be subjected. We have now discovered a method of modifying the surface of articles derived from essentially linear crystallizable polyesters which provides a substantially permanent modification, very resistant towards washing, scouring, dry-cleaning, and other such processes, yet which does not involve the formation of new covalent bonds with the existing surface of the article.

According to the present invention we provide a polyester shaped article made from a synthetic crystalline polyester which is provided with a surface structure containing active groups, said active groups being linked by groups containing ester or amide linkages to polyester repeat units which are identical with those repeat units constituting the crystalline segments of the internal structure of the shaped article, and which are attached to the internal structure of the shaped article by co-crystallization with crystalline polyester segments of the internal structure, said active groups being water-solvatable polymeric groups as hereinafter defined.

Further according to the present invention, we provide a process for the treatment of shaped articles, made from an essentially linear crystallizable polyester, with a water-insoluble crystallizable polymeric compound, wherein said crystallizable polymeric compound contains within a single molecule (A) sufficient repeat units identical with those forming the crystallizable portions of the polyester to confer crystallizability on the compound and (B) at least one water-solvatable polymeric group as hereinafter defined serving to modify the surface of the shaped article, the said crystallizable polymeric compound having a melting point above 100° C., measured by the temperature of disappearance of birefringence, and the said treatment being carried out by applying an aqueous dispersion of the crystallizable polymeric compound to the surface of the shaped article and subjecting the shaped article with the compound to a thermal treatment at a temperature above 90° C.

Further, according to the present invention we provide a stable dispersion of the aforesaid crystallizable polymeric compound in water, said dispersed polymer being a block or graft co-polymer, a first polymeric constituent of which is a crystalline polyester and a second polymeric constituent of which is solvated by water. These stable dispersions are particularly suitable for application to shaped articles such as filaments, fibers, fabrics and films made from a polymer which has repeat units which are chemically identical with the first polymeric constituent of the stable dispersion of the polymer in water.

It will be appreciated that the shaped article may contain other materials besides the polyester, for example it may be a fabric blend of polyester with cotton fibers.

Essentially linear crystallizable polyesters which may be treated according to our invention include fiber- and film-forming polyesters and co-polyesters derived from poly(ethylene terephthalate), poly(tetramethylene terephthalate), poly(1,4-bismethylenecyclohexane terephthalate), poly(ethylene naphthalene-2,6-dicarboxylate), and poly(ethylene diphenoxyethane-4,4'-dicarboxylate). In the case of poly(ethylene terephthalate) the crystallizable repeat unit has the structure

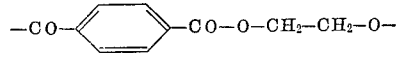

and in copolyesters containing ethylene terephthalate units the crystallisable repeat unit is the same provided that the proportion of ethylene terephthalate units is high enough. Polyesters and copolyesters containing at least 80 moles percent of poly(ethylene terephthalate) have proved especially successful commercially. Particular copolymers of poly(ethylene terephthalate) which have found some industrial application and to which this process may be applied include those in which adipate, sebacate, isophthalate, or sulphoisophthalate replace terephthalate; oxydiethylene or poly(oxyethylene) replace ethylene; p-oxyethoxybenzoate or p-oxybenzoate replace terephthalate; pentaerythritol, glycerol, or their derivatives are introduced to form chain-branching sites; or monoalkyl poly(oxyethylene) glycol is introduced to limit chain length. Poly(1,4-bismethylenecyclohexane terephthalate) has also proved successful commercially. By the phrase "essentially linear" we mean that the polyester is either unbranched or exhibits a minor degree of chain branching insufficient to render the polyester insoluble in solvents which dissolve the unbranched polymer.

When we refer to a crystallizable polymeric compound containing sufficient repeat units identical with those forming the crystallizable portions of the polyester being treated to confer crystallizability on the compound, we mean that the compound, whether copolymeric or oligomeric in nature, when examined in the crystalline form produces an X-ray diffraction pattern which contains reflections which are identical with the major reflections produced by the polyester in its crystalline form. It will be appreciated that the X-ray diffraction pattern produced by the compound may also contain additional reflections due to any other crystalline components which may be present. Thus, for example, where a crystalline poly(oxyethylene) segment is present, reflections attributable to this segment are also present in the X-ray diffraction pattern of the compound. Also where the compound used is oligomeric in nature and a mixture of such oligomeric materials is employed, lower molecular weight oligomers may contribute additional reflections to the spectrum or may reinforce certain reflections relative to others; thus for example a low molecular weight polyester with end-groups which are active groups is effectively a mixture of oligomers having active end-groups and may contain for example compounds with insufficient terephthaloyl units per molecule, in addition to those having sufficient terephthaloyl units per molecule to be of use in this invention; the X-ray diffraction pattern of the mixture contains reflections due to these lower molecular weight compounds in addition to those corresponding with the reflections provided by the components which are of use in the invention.

In some cases where the polyester segments (i.e. successions of repeat units) are short and the degree of crystallinity is consequently low, the X-ray diffraction pattern may be observed only with difficulty. The suitability of the compound may be determined by the temperature at which the crystalline birefringence disappears when the crystalline polymer is observed on a hot stage under a polarizing microscope. Thus for example where the only other crystallizable component present is a polyoxyethylene segment, which has a crystalline melting point below 70° C., if crystalline birefringent material is observed to melt above 100° C. this crystalline material must be derived from the polyester segments. For the copolymer to possess a high durability on the polyester surface the temperature of final loss of birefringence should be above 100° C. and preferably above 150° C. In cases where another crystalline segment is present which melts at a high temperature, for example if a polyester/polyamide block copolymer wherein both the polyester and the polyamide segments are crystallizable is employed, the temperature of final loss of birefringence is not by itself a sufficient test for the presence or absence of polyester crystallinity and it may then be necessary to examine the X-ray diffraction spectrum of the crystalline material to decide whether polyester crystallinity is present which would make the compound suitable for the treatment of our invention.

The active group present in the crystallizable polymeric compound may be present as an end group in the molecule or may be attached to other groups at one or more than one position. Of course, more than one active group may be present in the molecule of the crystallizable compound, and other groups which confer neither crystallizability nor surface modification may also be present.

The effect of incorporating a water-solvatable polymeric group is to render the surface of the shaped article hydrophilic and therefore wettable by water. Soil, particularly when attached to the shaped articles by oily substances is more easily displaced by water or aqueous detergents when the surface of the shaped article is rendered more hydrophilic, and the redeposition of soil from detergent media is also reduced. As a result, treated articles are washed more easily and more effectively than untreated articles. A further effect of incorporating a water-solvatable group is to increase the ability of adhesives, gums and sizes, including textile sizes, to adhere to the shaped article surface. In the case of filament yarns such improvements in size adhesion enable the yarn to be used as weaving warps without first subjecting the yarns to a twisting operation.

By a water-solvatable polymeric group we mean a polymeric group derived from a water-soluble polymer of average molecular weight at least 300, except that in the case where the water-solvatable polymeric group is a polyoxyalkylene group, the polyoxyalkylene group is derived from a polyoxyalkylene glycol having an average molecular weight in the range 300 to 6,000 inclusive and the viscosity ratio of the crystallizable polymeric compound, as measured in a 1% solution in orthochlorophenol at 25° C., lies in the range 1.1 to 1.5.

Thus for example polymeric groups derived from water-soluble polymers such as poly(vinyl alcohol), poly(vinyl methyl ether), poly(N,N-dimethyl acrylamide), methylcellulose, or hydroxyethyl cellulose are suitable for use as active groups. Polymeric groups derived from water-soluble poly(oxyalkylene) glycols are also suitable for use as active groups. Suitable polyoxyalkylene groups include polyoxyethylene, polyoxypropylene, polyoxytrimethylene, polyoxytetramethylene, polyoxybutylene, and copolymers thereof.

Where the active group serving to modify the surface of the shaped article is a polyoxyethylene group, polyoxyethylene groups derived from polyoxyethylene glycols having an average molecular weight of 300–6,000 are most suitable, and we particularly prefer to use polyoxyethylene groups derived from polyoxyethylene glycols having an average molecular weight in the range 1,000 to 4,000 inclusive. It will be appreciated that when we refer to polyoxyethylene groups derived from a particular polyoxyethylene glycol, this does not necessarily imply the use of that particular polyoxyethylene glycol in the preparation of the crystallizable polymeric compound but means that the polyoxyethylene group together with the elements of water is equivalent in molecular weight to that particular polyoxyethylene glycol; thus for example a polyoxyethylene group with a molecular weight of 282 is derived from a polyoxyethylene glycol of molecular weight 300.

It is a feature of our invention that it is not necessary that the crystallizable polymeric compound used in the treatment should itself be capable of forming shaped articles such as fibers or films, and indeed we prefer to use a crystallizable polymeric compound which is not itself capable of forming fibers, although crystallizable polymeric compounds which are capable of forming shaped articles can be used.

In the particular case where the active group is a polyoxyalkylene group, we use a crystallizable polymeric compound which is defined by a viscosity ratio, as measured in a 1% solution in orthochlorophenol at 25° C., in the range 1.1 to 1.5. No useful fiber- and film-forming properties are exhibited by the crystallizable polymeric compounds with the active groups and having viscosity ratios in this range. Crystallizable polymeric compounds having viscosity ratios above this range, although effective, require longer thermal treatment in contact with the surface of the shaped article and are rather more difficult to disperse in aqueous media, and more difficult to handle in solution and in the molten state, than crystallizable polymeric compounds having viscosity ratios within our range.

Where the active group is a polyoxyethylene group, our crystallizable polymeric compounds preferably contain 10–50% by weight of ethylene terephthalate repeat units together with 90 to 50% by weight of polyoxyethylene terephthalate repeat units derived from a polyoxyethylene glycol of average molecular weight 1,000 to 4,000, the molar ratio of ethylene terephthalate units to polyoxyethylene terephthalate units being between 2:1 and 6:1.

It is a particularly useful feature of those crystallizable polymeric compounds wherein water-solvatable polymeric groups are present as active groups, that they readily form stable dispersions in water, and that such dispersions are stable without addition of any conventional dispersing agent. A suitable and easy method of forming such dispersions is to run the crystallizable polymeric compound in the molten form into vigorously agitated water. In the case where the water-solvatable polymeric group is a polyoxyethylene group the temperature of the water should be carefully controlled during and after addition of the molten crystallizable polymeric compound, in order to obtain fluid dispersions of high solids content. For example, a water temperature of 40–60° C. is preferred in making dispersions from copolymers containing polyoxyethylene groups derived from polyoxyethylene glycols of average molecular weight 1540, and a molar ratio of ethylene terephthalate units to polyoxyethylene terephthalate units of 5:2.

Where a polyester shaped article is provided with a surface structure containing water-solvatable polyoxyalkylene groups as active groups, it is preferred that the surface structure should be sufficient to give a polyoxyalkylene concentration of about $1.0 \times 10^{-5}$ g./cm.$^2$ of surface of the shaped article.

A particular embodiment of our invention comprises a treatment of shaped articles containing crystallizable poly(ethylene terephthalate) with a viscosity ratio as measured in a 1% solution in orthochlorophenol at 25° C. greater than 1.5, with an aqueous dispersion of a crystallizable polymeric compound which is not fiber-forming and which contains sufficient ethylene terephthalate units to confer crystallizability on the compound and also contains an active group serving to modify the surface of the shaped article after the treatment, wherein the said crystallizable non-fiber-forming compound is a copolymer containing 10–50% by weight of ethylene terephthalate repeat units together with 90–50% by weight of polyoxyethylene terephthalate repeat units which have been derived from a polyoxyethylene glycol of average molecular weight 1,000–4,000, the molar ratio of ethylene terephthalate units to polyoxyethylene terephthalate units being between 2:1 and 6:1 and the viscosity ratio of the copolymer being between 1.10 and 1.50, and the melting point of the compound, measured by the temperature of disappearance of birefringence, being above 100° C. wherein the treatment is carried out by applying an aqueous dispersion of the crystallizable polymeric compound in the presence of an anti-oxidant, followed by subjecting the shaped article with the compound to a thermal treatment at a temperature above 90° C., to attain a durable coating of the compound on the shaped article.

A single crystallizable polymeric compound of definite molecular weight may be employed, and we have for convenience referred to such single compounds as being oligomeric in nature although it will be appreciated that such single crystallizable compounds are not true oligomers since they contain active groups as herein-defined. It is however much more convenient to prepare and use a mixture of crystallizable polymeric compounds of varying molecular weight such as is obtained by condensation polymerization of the precursors of the crystallizable repeat units with precursors of the active groups, or by degradation of preformed crystallizable polyester with a precursor of an active group. Thus Example 1 shows how a suitable crystallizable polymeric compound containing active groups may be prepared by condensation polymerization, and Example 3 shows how a suitable crystallizable polymeric compound containing basic dimethylhydrazide active groups may be prepared by degradation of preformed crystallizable polyester. We prefer to use a mixture of crystallizable polymeric compounds of varying molecular weight rather than a single crystallizable polymeric compound of definite molecular weight, but, where we refer to a crystallizable polymeric compound, we mean to include within the meaning of the term both a single compound of definite molecular weight and a mixture of crystallizable polymeric compounds differing in molecular weight but containing the same component groups.

The crystallizable polymeric compound may be a linear polymer or a branched-chain polymer. In the case where it is a branched-chain polymer, branching is obtained by incorporating chain-branching sites into groups which are derived from copolymerizable compounds having a functionality of three or more. By the functionality of a compound we mean the number of reactive functional groups per molecule. Thus a compound having three reactive functional groups per molecule is said to be trifunctional, or to have a functionality of three. Trimethylolpropane and trimethyl trimesate are examples of trifunctional compounds suitable for use in the preparation of branched crystallizable polymeric compounds by condensation polymerization. Polymeric copolymerizable compounds having a functionality of three or more may be employed to introduce branched chains, and these may also contain active groups, as is the case with glycerol-ethylene oxide or pentaerythritol-ethylene oxide condensates which have functionalities of 3 and 4 respectively.

The crystallizable polymeric compound may be a random copolymer, or it may be a block copolymer, or it may be a graft copolymer. In general, where the active group is itself polymeric, the crystallizable polymeric compound will be a block or graft copolymer.

It is of course possible to apply a crystallizable polymeric compound containing more than one active group, or to apply together or consecutively two or more crystallizable polymeric compounds containing different active groups.

The crystallizable polymeric compound or compounds may be applied to the shaped article from a dispersion in water or an aqueous medium.

It will be appreciated that although it is essential for the purpose of this invention that the polymeric compound be crystallizable it is not essential that the polymeric compound be applied to the surface of the shaped article in a crystalline form. Similarly, although it is essential for the purpose of this invention that the shaped article contain or comprise an essentially linear crystallizable polyester, it is not essential that the crystallizable polyester, it is not essential that the crystallizable polymeric compound be aplied to the surface while the shaped article is in the crystalline form. In such cases, of course, it is necessary for crystallinity to be developed in the crystallizable polymeric compound and in the shaped article subsequent to the application.

In order to produce a durable surface treatment it is essential to heat the compound in contact with the surface of the shaped article. Where a dispersion of the crystalizable polymeric compound is used, continuous phase may be removed by the same or by a previous thermal treatment, or may be allowed to evaporate before thermal treatment. The compound may also be applied directly from a continuous phase, for example by using techniques normally applied for dyeing with disperse dyestuffs. The temperature required to produce a durable surface treatment is above 90° C. and preferably the temperature should exceed 150° C. Obviously the temperature should not be so high as to melt or damage the shaped article, so temperatures above the melting point of the shaped article can only be applied for very short times.

It is useful, particularly when the active group or groups is affected by atmospheric oxygen at the temperature of the thermal treatment, to carry out the thermal treatment with an anti-oxidant present. This anti-oxidant may be present as an active group in a crystallizable polymeric compound, as described in the above-mentioned application Ser. No. 370,068. It may alternatively be present as a separate compound dissolved or dispersed in the treating composition.

The presence of an anti-oxidant is particularly important where polyoxyalkylene groups are present as active groups. Many classes of compound have been disclosed as anti-oxidants suitable for stabilizing polyethers, and these are generally effective for stabilizing polyoxyalkylene active groups during the surface treatment. In considering those most suitable in the present application it is necessary to satisfy the criteria that the anti-oxidant should be stable and effective at the temperatures employed in the thermal treatment and that it should produce no undesirable color or odor. For example, Santonox R (reg. trademark, Monsanto) or Irganox 858 (reg. trademark, Geigy) are prefererred to pyrogallol or zinc diethyldithiocarbamate since they produce no discoloration. A combination of two or more anti-oxidants may give better results than either anti-oxidant alone. Thus, for example, a mixture of zinc dinonyldithiocarbamate with 2-$\alpha$-methylcyclohexyl-4,6-dimethylphenol is more effective than either anti-oxidant used alone.

The following examples, in which all parts and percentages are by weight, illustrate but do not limit our invention.

EXAMPLE 1

This illustrates the preparation of and treatment with a crystallizable polymeric compound containing active groups which are salts of an acid, namely sodium sulphoisophthalate.

Dimethyl terephthalate (53.7 parts) dimethyl sodium sulphoisophthalate (9.1 parts) ethylene glycol (43 parts). calcium acetate hemihydrate (0.049 part) and antimony trioxide (0.025 part) were mixed and heated together; methanol was evolved, and distilled off until the theoretical amount of methanol had been removed. Phosphorous acid (0.09 part) was added, and excess glycol was distilled off and the residue polymerized under reduced pressure at 282° C. until a polymer with viscosity ratio of 1.42 (measured on a 1% solution in o-chlorophenol at 25° C.) was obtained. This polymer contained enough poly(ethylene terephthalate) repeat units to crystallize; the X-ray diffraction pattern was characteristic of a polymer containing poly (ethylene terephthalate) in crystalline form.

The polymer was dispersed in water to give a 10% dispersion, and the dispersion was padded onto a 100% "Terylene" (trademark) taffeta fabric, which was mangled and baked in an oven to give 3% solids by weight on the fabric. Baking temperatures and times ranged from 150–200° C. and from 5–10 minutes. The treated fabric had a crisp handle and was resistant to deformation. It dyed readily on the surface with basic dyes, such as Malachite Green, to give a uniform deep green color.

Samples of the treated fabric were subjected to 30 wash-day cycles each consisting of a 6-minute wash in 0.07% "Persil" (reg. trademark) detergent solution at 60° C. in a "Hoover" washing machine, rinsing in water, three spin-dry treatments, and drying in a hot air tumbler drier at 60° C. After the final wash-dry cycle the fabrics still retained a crisp handle and were surface dyed by Malachite Green; this demonstrated that the surface treatment was very durable to washing. Untreated "Terylene" fabric was not dyed by Malachite Green.

EXAMPLE 2

This illustrates the preparation of and treatment with a crystallizable polymeric compound containing two active groups, namely a water-solvatable polyoxyethylene group and a salt of an acid group, which is sodium sulphoisophthalate.

Dimethyl terephthalate (77.6 parts), ethylene glycol (62 parts) Carbowax 1540 polyethylene glycol (77 parts), dimethyl sodium sulphoisophthalate (14.8 parts), calcium acetate hemihydrate (0.06 part), antimony trioxide (0.03 part), and 2,6-dimethyl-4-$\alpha$-methyl cyclohexyl phenol (0.077 part) were reacted with evolution of methanol then polymerized as in Example 1 until a polymer with a viscosity ratio of 1.25 (measured on a 1% solution in o-chlorophenol at 25° C.) was obtained. This polymer contained enough poly(ethylene terephthalate) units to crystallize.

The polymer was dispersed in water to give a 5% dispersion, 2% of pyrogallol (based on the polymer) was added, and the dispersion was padded onto a 100% poly (ethylene terephthalate) taffeta fabric, which was mangled and baked at 180° C. for 5 minutes to give 2.8% by weight of polymer on the fabric. The fabric had an electrical resistance of $2.1 \times 10^4$ megohms (measured lengthwise on a sample 7" x 1½" at 65% relative humidity). After 10 wash-dry cycles as described in Example 1, the fabric was rinsed in water of conductivity $1.5 \times 10^{-3}$ mhos, spin dried for 2 minutes, and tumbler dried at 60° C. The electrical resistance was $2.7 \times 10^4$ megohms. After further 20 washes the resistance had risen to only $1.7 \times 10^5$ megohms, compared with over $10^7$ megohms for untreated fabric. The surface treatment therefore exhibited high durability towards washing.

EXAMPLE 3

This illustrates the preparation of and treatment with a crystallizable polymeric compound containing an active group which is a basic group, namely dimethylhydrazide and which is present as an end-group. This also illustrates the preparation of a crystallizable polymeric compound by degradation of a preformed polyester.

Dimethyl terephthalate (97 parts), ethylene glycol (1.85 parts) calcium acetate (0.075 part), and antimony trioxide (0.04 part) were mixed and caused to ester interchange until no more methanol was evolved. After ester interchange phosphorous acid (0.035 part) was added, followed by N,N-dimethylhydrazine (20 parts) dissolved in ethylene glycol (80 parts). Excess glycol was removed by rapid distillation under reduced pressure at 192° C. with nitrogen passing through the molten mixture. The product was extruded, and found to have a viscosity ratio of 1.08 (determined in a 1% solution in orthochlorophenol at 25° C.), and a melting point of 115–145° (measured by noting the range over which the sample lost birefringence on the hot stage of a polarizing microscope).

The product was readily dispersed in water by milling it with gravel; a 6% dispersion was prepared, applied to a 100% poly(ethylene terephthalate) taffeta fabric by padding and mangling, and baked on at 180° C. for 5 minutes. The fabric was now readily dyeable on the surface by acid dyes, but color was removed by scouring with 5% aqueous sodium carbonate. The fabric had an electrical resistance of $1.05 \times 10^5$ megohms (measured on a sample 7" x 1½" at 65% relative humidity). After 10 wash-dry cycles each consisting of a 6 minute wash in 0.07% detergent "Persil" (registered trademark) solution at 60° C. in a "Hoover" washing machine, rinsing in water, three spin-dry treatments, and drying in a hot air tumbler drier at 60° C. the fabric was rinsed in water of conductivity $1.5 \times 10^{-3}$ mhos. spin dried for 2 minutes, and tumbler dried at 60° C. The electrical resistance was $3.2 \times 10^5$ megohms. After further 20 washes the resistance had risen only to $5.6 \times 10^5$ megohms. These results indicate that the surface treatment shows high durability to washing and provides useful anti-static activity. After 30 washes the fabric was still surface-dyed by acid dyes, for example "Carbolan" (registered trademark) Blue B; the color was removed by scouring with alkali, but not by washing with water or with detergent solution as above.

EXAMPLE 4

This illustrates the preparation of and treatment with a crystallizable polymeric compound containing an active group which is a basic group, namely polyethylene N-methyl imino diacetate.

A block copolymer of poly(ethylene terephthalate) with poly(ethylene N-methyl imino diacetate) was prepared by heating the homoplymers, of viscosity ratios respectively 1.11 and 1.07 (1% solution of polymer in o-chlorophenol, at 25° C.), together with the ratio 192:173 at 282° C. for 5 minutes under nitrogen. The copolymer was crystalline, the crystallinity being due to the poly(ethylene terephthalate) units. The copolymer was dispersed in water by ball-milling to give a dispersion containing 10% of copolymer. The dispersion was applied to a 100% poly(ethylene terephthalate) taffeta fabric as described in Example 1. The fabric was now readily dyeable on the surface with acid dyes, but color was removed by scouring with alkali. After 30 washes, carried out as described in Example 1, the fabric was still readily dyeable on the surface by acid dyes indicating that the surface treatment was very durable to washing.

EXAMPLE 5

This illustrates the preparation of and treatment with a crystallizable polymeric compound containing an active group which is a water-solvatable polyoxyethylene group. The compound is applied as a solution in a solvent which is a plasticizer for the shaped article.

Dimethyl terephthalate (97 parts), ethylene glycol (31 parts), and a poly(oxyethylene) glycol of average molecular weight 1500 (187.5 parts) were mixed with the ester interchange catalyst zinc acetate dihydrate (0.035 part) and subjected to ester interchange until the theoretical volume of methanol had been evolved. The product crystallized on cooling; a sample re-heated on a hot-stage began to flow from about 94° C., but the crystallinity (observed as birefringence) disappeared over a range up to 165° C. The composition of this product was 4 ethylene dioxy units: 4 terephthaloyl units: 1 poly (oxyethylene) unit, so that although the actual composition was that of a mixture of compounds, on average each molecule contained 4 units of ethylene terephthalate and 1 poly (oxyethylene) unit. Since the poly (oxyethylene) unit can be located either in the middle of a chain or at the end, the average number of consecutive ethylene terephthalate units is less than 4.

A solution of 20% of this compound in benzyl alcohol was used as a padding bath through which a 100% poly(ethylene terephthalate) plain weave taffeta fabric was padded, the fabric then being heated on a stenter frame at 150° C. for 30 minutes. The fabric was scoured for 30 minutes at 60° C. in an aqueous scouring bath containing Lissapol C (reg. trademark) (2 g./liter) and sodium carbonate (1 g./liter). The scoured fabric was washed well with water and dried. The treated fabric, when rubbed against another poly(ethylene terephthalate) fabric, developed no stable electrostatic charge, whereas a similar untreated fabric developed a heavy electrostatic charge which persisted for many seconds and caused dust, dirt, and ash to be attracted to the surface. The untreated fabric developed an electrostatic charge with a half-life of greater than 3 minutes, as measured on a Hayek-Chromey static tester. (American Dyestuffs Reptr. 40, 164, 1951), whereas no electrostatic charge could be measured on the treated fabric. The treated fabric was further scoured with a detergent at 95° C. for 1 hour then washed free from detergent; the fabric so scoured developed an electrostatic charge with a half-life of only 4 seconds. The treated fabric was also readily wetted by water, whereas the untreated fabric was not.

We have found that a convenient measure of the wettability of fabric by water is as follows:

Fabric samples, 2" x 2", were wetted with Shell Risella Oil 23 (reg. trademark) containing Calcosperse Violet B dye and were then immersed in water. The contact angle of the oil on the fabric was used as a measure of the wettability of the fabric. For example, on an untreated poly(ethylene terephthalate) fabric the contact angle between the oil and fabric was low, whereas on a treated fabric the contact angle was high and the oil, in some cases, was displaced completely from the fabric by water.

EXAMPLE 6

This illustrates the preparation of and treatment with a crystallizable polymeric compound containing an active group which is a water-solvatable poly(oxyethylene group) which is present as an end-group in the crystallizable compound and which is applied from a solution in a solvent which acts as a plasticizer for the shaped article.

Dimethyl terephthalate (97 parts), ethylene glycol (31 parts), and O-methyl poly(oxyethylene) glycol of average molecular weight 350 (58 parts) were mixed with zinc acetate dihydrate (0.035 part) and subjected to ester interchange until the theoretical volume of methanol has been evolved. The product crystallized on cooling; a sample re-heated on a hot stage began to flow at about 160° C., but the crystallinity (observed as birefringence) disappeared over a range up to 208° C. The composition of this product was 3 ethylenedioxy units; 3 terephthaloyl units: 1 methyl poly(oxyethylene) unit, so that, although the actual composition was that of a mixture of compounds, on average each molecule contained 3 units of ethylene terephthalate and one methyl poly (oxyethylene) unit. Since the latter unit can only occur at the ends of chains, the average number of consecutive ethylene terephthalate units in a molecule is also 3.

A solution of 20% of this compound in benzyl alcohol was used to treat a 100% poly(ethylene terephthalate) taffeta in the manner described in Example 5. Again, the scoured fabric developed appreciably no stable electrostatic charge when rubbed, and was accordingly resistant to soiling. The treated fabric was also readily wetted by water.

EXAMPLE 7

This illustrates the preparation of and treatment with a crystallizable polymeric compound containing an active group which is a water-solvatable poly (oxyethylene) group and which is present as an end-group, the crystallizable compound being applied from aqueous dispersion.

Example 2 was repeated but with the methyl poly (oxyethylene) glycol content increased to give a ratio of 2 ethylene terephthalate units to 1 methyl poly (oxyethylene) glycol unit instead of the 3:1 employed in Example 2. The crystalline product began to flow at 110° C., but the crystallinity disappeared over a range up to 193° C.

A dispersion of 20% of this compound in water was used instead of the benzyl alcohol solution in the padding bath of Example 1. After the padding, heating and scouring treatments, the fabric was washed with water and dried. The fabric was readily wetted by water, and developed no stable electrostatic charge when rubbed against another poly (ethylene terephthalate) surface.

EXAMPLE 8

This example illustrates the use of an anti-oxidant with a crystallizable polymeric compound containing an active group which is a water-solvatable branched poly oxyethylene group derived from a glycerol-ethylene oxide condensate with a functionality of 3.

Dimethyl terephthalate (194 parts), ethylene glycol (62 parts), a glycerol-ethylene oxide condensate containing 65 oxyethylene units per glycerol unit (246 parts), and zinc acetate dihydrate (0.07 part) were heated together, with removal of methanol by means of a fractionating column, until no further methanol was evolved. The product was a copolymer having a viscosity ratio of 1.20 (measured on a 1% solution in orthochlorophenol at 25° C.), softening at about 95° C. and exhibiting birefringence on the hot stage of a polarizing microscope until 204° C. This product was dispersed in water by gravel-milling.

A 100% poly(ethylene terephthalate) plain weave taffeta fabric was padded with the aqueous dispersion to give 3% by weight of the copolymer on the fabric. The fabric was then heated on a stenter frame at 200° C. for 5 minutes. A similar piece of fabric was treated in the same way, except that pyrogallol (2% by weight based on the dispersed material) was added to the dispersion before padding. The lengthwise resistances of 7″ x 1½″ samples of the treated fabrics were measured at 65% relative humidity. The fabrics were then subjected to a series of 30 wash-dry cycles, each consisting of a 6 minute wash in a 0.07% solution of a commercial soap powder at 60° C. in a washing machine, rinsing in water, three spin-dry treatments, and drying in a hot air tumbler drier at 60° C. After the thirtieth wash-dry cycle the fabrics were rinsed in water of conductivity 1.5 x $10^{-3}$ mhos, spin-dried for 2 minutes, and tumble-dried at 60° C. The lengthwise electrical resistances of samples 7″ x 1½″ were measured at 65% relative humidity. The following results were obtained:

| | Resistance megohms | |
|---|---|---|
| | Without pyrogallol | With pyrogallol |
| Treated fabric, unwashed | $1.6 \times 10^6$ | $2.5 \times 10^4$ |
| Treated fabric, after 30 wash-dry cycles | $1.0 \times 10^7$ | $3.4 \times 10^4$ |

A very substantially improved conductivity, anti-static performance, wettability, and washability were obtained both on the unwashed fabric and on the fabric after 30 wash-dry cycles, in the case where the anti-oxidant pyrogallol was present.

EXAMPLE 9

This illustrates the preparation of and treatment with a water dispersible crystallizable polymeric compound containing an active group which is a branched poly oxyethylene group derived from a pentaerythritol-ethylene oxide condensate with a functionality of 4.

A pentaerythritol-ethylene oxide condensate containing 36.5 oxyethylene units per pentaerythritol unit (174.2 parts), dimethyl terephthalate (154.7 parts), ethylene glycol (49.6 parts), and zinc acetate (0.056 part) were heated together, with removal of methanol by means of a fractionating column, until no more methanol was evolved. The product was a copolymer which had a viscosity ratio of 1.34 (measured on a 1% solution in orthochlorophenol at 25° C.) and which remained birefringent on the hot stage of a polarizing microscope until 188° C. The product was dispersed in water by gravel-milling, and applied, with added pyrogallol, to a poly(ethylene terephthalate) fabric as in Example 8. The treated fabric was subjected to 30 wash dry cycles and conditioned as in Example 5 before measurement of the electrical resistance, which was $4.5 \times 10^4$ megohms. The fabric was readily wetted by water and developed no stable electrostatic charge on rubbing.

EXAMPLE 10

This illustrates the preparation of and treatment with a crystallizable polymeric compound which is branched due to the use of pentaerythritol with a functionality of 4.

Dimethyl terephthalate (194 parts), ethylene glycol (55.1 parts), pentaerythritol (3.8 parts), poly (oxyethylene) glycol of average molecular weight 1540 (171.1 parts), calcium acetate hemihydrate (0.151 part), and "Topanol OC" anti-oxidant (0.171 part) were heated together, with removal of methanol by means of a fractionating column, until no more methanol was evolved. The product was a copolymer having a viscosity ratio of 1.14 (measured on a 1% solution in orthochlorophenol at 25° C.) and which remained birefringent on the hot stage of a polarizing microscope until 201° C. The product was dispersed in water by gravel-milling, and applied, with added pyrogallol, to a poly(ethylene terephthalate) fabric as in Example 5, except that the fabric was heated on a stenter at 180° C. for 5 minutes instead of at 200° C. for 5 minutes. The treated fabric was subjected to 30 wash-dry cycles and conditioned as in Example 8; the electrical resistance was found to be $2.7 \times 10^4$ megohms. The fabric was readily wetted by water and developed no stable electrostatic charge on rubbing.

EXAMPLE 11

This illustrates the preparation of and treatment with a crystallizable compound containing an active group which is a water-solvatable poly oxyethylene group derived from poly(oxyethylene) glycol of average molecular weight 1540.

Dimethyl terephthalate (194 parts), ethylene glycol (155 parts), poly(oxyethylene) glycol of average molecular weight 1540 (440 parts), 2,6-di-tert-butyl-4 methylphenol (0.44 part), calcium acetate (0.1512 part) and antimony trioxide (0.0388 part) were heated from 194° C. to 234° C. over a period of 4½ hours during which time 57 parts of methanol were removed by distillation. Phosphorous acid (0.141 part of a 24.8% solution in ethylene glycol) was added and the molten material was transferred to a polymerization tube heated to 282° C. After the excess glycol had been blown off in a rapid stream of nitrogen the pressure was reduced to 0.1 mm. of mercury and polymerization was continued for 15 min. The resultant product (viscosity ratio 1.21 as measured on a 1% solution in orthochlorophenol at 25° C.) softened at 40–50° C. and melted (as shown by final loss of crystallinity) at 198–200° C. The product was melted at 200° C. and dropped into water with vigorous agitation to give a 10% w./v. dispersion. An anti-oxidant, Irganox 858 (reg. trademark, Geigy), (1% by weight based on the dispersed solids) was added to the dispersion from acetone solution.

A 100% poly(ethylene terephthalate) plain weave taffeta fabric was padded with the aqueous dispersion to give 3% by weight of the copolymer on the fabric. The fabric was then heated on a stenter frame at 200° C. for 30 seconds. The fabric was then subjected to a series of 80 wash-dry cycles, each as described in Example 8. After the eightieth washing-drying cycle the fabric was rinsed in water of conductivity $1.5 \times 10^{-3}$ mhos spin-dried for 2 minutes, and tumble-dried at 60° C. The lengthwise resistance of a sample 7″ x 1½″ at 65% relative humidity was $7.0 \times 10^4$ megohms, and the fabric still showed improved wettability and oil displacement by water and absence of static electrification on rubbing.

EXAMPLE 12

This illustrates the durable treatment of fabric comprising poly(ethylene terephthalate) fibers and wool, with the crystallizable compound used in Example 11.

A woven fabric comprising 55% poly(ethylene terephthalate) fibers and 45% wool fibers was padded, to give 3% by weight of the copolymer on the fabric with the dispersion described in Example 11 except that sodium lauryl sulphate (0.015% by weight on the dispersed solids) was added to the dispersion before padding and an antioxidant, Santonox R (reg. trademark, Monsanto), (0.5% by weight based on the dispersed solids) was added to the dispersion at a 50% w./v. solution in polyethylene glycol 200 instead of the anti-oxidant Irganox 858 (reg. trademark, Geigy). The fabric was heated on a stenter at 170° C. for 30 seconds. The treated fabric was subjected to 30 wash-dry cycles and conditioned as in Example 8; the electrical resistance was found to be $4.4 \times 10^4$ megohms, compared to $2.8 \times 10^6$ for untreated fabric. After this treatment the fabric was still readily wetted by water, and oil was readily displaced by water from the fabric.

EXAMPLE 13

This illustrates the durable treatment of fabric comprising polyethylene terephthalate fibers and cotton with the crystallizable compound described in Example 11.

A woven fabric comprising 67% poly(ethylene terephthalate) cotton type staple fibers and 33% cotton fiber was padded with the aqueous dispersion described in Example 11 to give 3% by weight of solids on the fabric which was then heated on a stenter frame at 180° C. for 30 seconds. The fabric was then subjected to a series of 30 wash-dry cycles as described in Example 5. After the thirtieth washing-drying cycle, the treated fabric developed no stable electrostatic charge when rubbed against a poly(ethylene terephthalate) fabric, whereas a similar untreated fabric developed an electrostatic charge which persisted for many seconds and caused dust, dirt, and ash to be attracted to the surface. The treated fabric was also more readily wetted by water than the untreated fabric.

EXAMPLE 14

This illustrates the durable treatment of fabric comprising poly(1,4 bismethylenecyclohexane terephthalate) fibers and wool and the comparative example illustrates that the treatment is not effective on fabric comprising polyethylene terephthalate and wool, because the repeating units causing crystallinity in the compound used for the treatment (in this case, 1,4 bismethylenecyclohexane terephthalate units) are not the same as the units producing crystallinity in the article treated (in this case, ethylene terephthalate units).

Dimethyl terephthalate (97 parts), 1,4-bishydroxymethyl cyclohexane (51.5 parts), poly (oxyethylene) glycol of average molecular weight 1540 (220 parts), and tetra-butyl titanate (0.074 part) were heated under atmospheric pressure to 272° C. until the theoretical volume of methanol had been evolved. The resultant product (viscosity ratio 1.16 as measured on a 1% solution in orthochlorophenol at 25° C.) melted (as shown by final loss of birefringence) at 248° C. The product was softened at 200° C. and dropped into water with vigorous agitation to give a 10% w./v. dispersion. Sodium lauryl sulphate (0.015% by weight on the dispersed solids) was added to the dispersion. An anti-oxidant, Santonox R (reg. trademark, Monsanto), (0.5% by weight based on the dispersed solids) was added as a 50% w./v. solution in polyethylene glycol 200 to the dispersion.

A woven fabric comprising 55% poly (1,4-bis-methylene cyclohexane terephthalate) and 45% wool was padded with the aqueous dispersion to give 3% by weight of solids on the fabric. The fabric was then heated on a stenter frame at 170° C. for 30 seconds.

The fabric was then subjected to a series of 30 wash-dry cycles, as described in Example 8. After the thirtieth washing-drying cycle, the fabric was rinsed in water of conductivity $1.5 \times 10^{-3}$ mhos, spin-dried for 2 minutes, and tumble-dried at 60° C. The lengthwise resistance of a sample 7" x 1½" at 65% relative humidity was $1.1 \times 10^5$ megohms, compared with $3.0 \times 10^6$ megohms for untreated fabric. After this treatment the fabric was still readily wetted by water, and oil was readily displaced by water from the fabric.

EXAMPLE 14A

Example 14 was repeated using a woven fabric comrising 55% poly(ethylene terephthalate) and 45% wool. The treated fabric, subjected to 10 wash-dry cycles and conditioned as described in Example 8, had an electrical resistance of $1.0 \times 10^6$ megohms and developed electrostatic charge in the same way as untreated fabric, thus illustrating that the treatment is not effective when the repeating units causing crystallinity in the compound used for the treatment (in this case, 1,4-bis methylene cyclohexane terephthalate units) are not the same as the units producing crystallinity in the article treated (in this case, ethylene terephthalate units).

EXAMPLE 15

This illustrates treatment of poly(ethylene terephthalate) fabric with a crystallizable polymeric compound containing water-solvatable poly oxethylene groups as active groups. It illustrates that treatment of poly (ethylene terephthalate) is not durable when crystallinity in the crystallizable polymeric compound is due to crystallinity from segments of poly (tetra methylene terephthalate) repeat units which differ from those in the shaped article but is durable when crystallinity is due to poly(ethylene terephthalate) repeat units.

Dimethyl terephthalate (97 parts), tetramethylene glycol (112.5 parts), poly (oxyethylene) glycol of average molecular weight 1540 (85.5 parts), lead oxide (0.0388 part) and 2,6-di-tert-butyl-4-methyl phenol (0.0855 part) were heated under ester interchange conditions and then heated to 282° C. under vacuum to remove excess glycol. The resultant product (viscosity ratio 1.16 as measured on a 1% solution in orthochlorophenol at 25° C.) melted (as shown by final loss of crystallinity) at 185° C. The product was melted at 200° C. and dropped into water with vigorous agitation to give a 10% w./v. dispersion. An anti-oxidant pyrogallol (2% by weight based on the dispersed solids) was added to the dispersion.

A 100% poly(ethylene terephthalate) plain weave taffeta fabric was padded with the aqueous dispersion to give 3% by weight of solids on the fabric. The fabric was then heated on a stenter frame at 200° C. for 5 minutes.

The fabric was then subjected to a series of 10 wash-dry cycles and conditioned as described in Example 8. The lengthwise resistance of a sample 7" x 1½" at 65% relative humidity was $2.3 \times 10^6$ megohms.

The above example was repeated except that the treating composition was prepared from ethylene glycol (31 parts) instead of tetramethylene glycol. The product (viscosity ratio 1.16 as measured on a 1% solution in orthochlorophenol at 25° C.) melted (as shown by final loss of crystallinity) at 218° C. A 100% poly(ethylene terephthalate) fabric was treated as above with a dispersion of the product and subjected to a series of 20 wash-dry cycles as described in Example 8. The lengthwise resistance of a sample 7" x 1½" at 65% relative humidity was $3.6 \times 10^4$ megohms.

This example illustrates that the treatment is only effective when the repeating units causing crystallinity in the compound used for the treatment are the same as the units producing crystallinity in the article treated.

EXAMPLE 16

This illustrates treatment of spun, substantially non-crystalline poly(ethylene terephthalate) yarn, with a crystallizable polymeric compound containing active groups which are water-solvatable poly oxyethylene groups.

Dimethyl terephthalate (194 parts), ethylene glycol (155 parts), poly (oxyethylene) glycol of average molecular weight 1540 (385 parts), 2,6-di-tert-butyl-4-methylphenol (0.385 part), calcium acetate (0.1512 part) and antimony trioxide (0.0388 part) were heated from 200° C. to 220° C. over a period of 5½ hours during which time 60 parts of methanol were removed by distillation. Phosphorous acid (0.844 part of a 26.3% aqueous solution) was added and the molten material was transferred to a polymerization tube heated to 284° C. After the excess glycol had been blown off in a rapid stream of nitrogen, the pressure was reduced to 0.1 mm. of mercury and polymerization was continued for 45 minutes. The resultant product (viscosity ratio 1.21 as measured on a 1% solution in orthochlorophenol at 25° C.) melted (as shown by final loss of crystallinity) at 188° C. The product was melted at 200° C. and dropped into water with vigorous agitation to give a 10% w./v. dispersion. Sodium lauryl sulphate (0.015% by weight based on the dispersed solids) was added to the dispersion. An anti-oxidant, Santonox R (reg. trademark, Monsanto), (0.5% by weight based on the dispersed solids) was added as a 50% w./v. solution in polyethylene glycol 200 to the dispersion.

The aqueous dispersion was applied to 160 denier 24 filament poly(ethylene terephthalate) spun yarn of birefringence 8 by means of a lick roll (diameter 2½") revolving at 25 r.p.m. The yarn was then drawn by passing it 8 times round a heated feed roll (diameter 5") at 110° C. and 6 times round a heated draw roll (diameter 5") at 175° C. The draw ratio was 3.22. The drawn yarn, which contained 2% solids based on weight of yarn, was wound under tension onto a bobbin in the normal manner.

A sample of the treated yarn was twisted to 5 t.p.i. and woven into a plain weave taffeta fabric with 100 ends per inch and 100 picks per inch. This fabric was subjected to a series of 30 wash-dry cycles and conditioned as described in Example 8. The lengthwise resistance of a sample 7" x 1½" at 65% relative humidity was $1.0 \times 10^4$ megohms. The resistance of a sample woven from untreated yarn was greater than $10^7$ megohms, both before and after the above wash-dry treatment. After the above wash-dry treatment the fabric woven from treated yarn was still readily wetted by water and developed no stable electrostatic charge on rubbing.

EXAMPLE 17

This illustrates the improved adhesion to textile sizes of poly(ethylene terephthalate) yarn, treated with a crystallizable polymeric compound containing active groups which are water-solvatable polyoxyethylene groups.

The drawn, twistless, treated poly(ethylene terephthalate) yarn, described in Example 16, was single-end sized with an aqueous solution of poly(acrylic acid) to give 5% by weight of solid poly(acrylic acid) on the dried yarn. "Lubricant N" (reg. trademark, Allied Colloids) (1% by weight on yarn) was then applied. Fabric, having 90 ends and picks per inch, was woven using the treated, sized yarn as the warp and untreated, unsized yarn as the weft. The weaving performance of the warp was completely satisfactory. By contrast it was found impossible to weave using a warp prepared from twistless, sized, untreated poly(ethylene terephthalate) yarn due to broken ends as a result of poor adhesion between the fiber and size.

The improvement in adhesion was demonstrated directly by means of an apparatus in which sized yarn, tensioned by a weight of 10 g., was abraded at 40% relative humidity against a polished brass rod of diameter 0.5 cm. The tensioned yarn was given one complete turn round the rod and caused to rub against it in a reciprocating motion of amplitude 12 cm. The number of rubs necessary to cause the filaments to separate from one another was determined visually. In the case of the treated, sized yarn, 700 rubs were required, whereas the adhesion of the untreated, sized yarn broke down, causing the filaments to separate from one another after only 10 rubs.

EXAMPLE 18

This illustrates the treatment of poly(ethylene terephthalate) fabric with crystallizable polymeric compounds containing active groups which are water-solvatable poly(oxyethylene) groups, in particular it illustrates the optimum range of molar ratio of ethylene terephthalate: poly(oxyethylene terephthalate).

Dimethyl terephthalate, ethylene glycol and poly(oxyethylene) glycol of average molecular weight 1540 were subjected to ester interchange conditions in such proportions as to produce co-polymers of ethylene terephthalate: poly(oxyethylene terephthalate) molar ratios 1:1, 3:2, 2:1, 5:2, 3:1, 4:1, 5:1, 8:1. These products were dispersed in water and applied, with pyrogallol as anti-oxidant, to 100% poly(ethylene terephthalate) fabric which was then heated at 200° C. for 5 minutes. The treated fabrics were subjected to 10, 20 and 30 wash-dry cycles and conditioned as in Example 8. The data for the copolymers and the electrical resistances of 7" x 1½" samples of the treated fabrics at 65% relative humidity are presented in tabular form below:

| Molar ratio ethylene terephthalate:polyoxyethylene terephthalate | Crystalline melting point, ° C. | Viscosity ratio | Electrical resistance of treated fabric (megohms) after— | | |
|---|---|---|---|---|---|
| | | | 10 washes | 20 washes | 30 washes |
| 1:1 | 126 | 1.40 | $9.6 \times 10^4$ | $2.0 \times 10^5$ | $3.8 \times 10^5$ |
| 3:2 | 148 | 1.47 | $2.3 \times 10^4$ | $6.9 \times 10^4$ | $1.4 \times 10^5$ |
| 2:1 | 176 | 1.36 | $1.7 \times 10^4$ | $2.2 \times 10^4$ | $7.3 \times 10^4$ |
| 5:2 | 204 | 1.21 | $5.8 \times 10^3$ | $1.9 \times 10^4$ | $2.9 \times 10^4$ |
| 3:1 | 188 | 1.21 | $3.7 \times 10^3$ | $1.5 \times 10^4$ | $3.1 \times 10^4$ |
| 4:1 | 218 | 1.19 | $1.4 \times 10^4$ | $1.9 \times 10^4$ | $2.7 \times 10^4$ |
| 5:1 | 214 | 1.23 | $1.0 \times 10^4$ | $2.5 \times 10^4$ | $3.5 \times 10^4$ |
| 8:1 | 222 | 1.22 | $2.1 \times 10^5$ | $2.5 \times 10^5$ | $3.4 \times 10^5$ |

These results show that there is an optimum range of molar ratios of ethylene terephthalate: polyoxyethylene terephthalate. For copolymers derived from poly(oxyethylene) glycol of average molecular weight 1540, the optimum range of molar ratios is 2:1 to 5:1. Copolymers of molar ratios less than 2:1 show poorer durability due to the fact that they do not contain sufficient ethylene terephthalate repeat units to give them, in the crystalline form, a high degree of crystallinity. Copolymers of molar ratios greater than 5:1 show good durability; however, they contain lower proportions of polyoxyethylene groups than those of molar ratio 2:1 to 5:1 and are therefore less effective antistatic agents.

EXAMPLE 19

This example illustrates the preparation of and treatment with a polymeric compound which has water-solvatable active groups in the presence of one and two anti-oxidants. A synergistic effect is demonstrated in the presence of two anti-oxidants.

The crystallizable copolymer described in Example 8 and prepared from dimethyl terephthalate, ethylene glycol and poly(oxyethylene) glycol of average molecular weight 1540 was melted at 200° C. and dropped into water with vigorous agitation to give a 10% w./v. dispersion. The dispersion was divided into 3 parts to which was added (1) zinc dinonyl-dithiocarbamate (1% by weight based on dispersed solids), (2) 2-α-methylcyclohexyl-4,6-dimethylphenol (1% by weight based on dispersed solids), and (3) a 50:50 weight percent mixture of these anti-oxidants (1% by weight based on dispersed solids) respectively. Poly(ethylene terephthalate) fabrics were padded with the aqueous dispersions to give 3% by weight of the copolymer on the fabric dried and weighed. The fabrics were then heated at 200° C. for 10 minutes and re-weighed.

| | Percent weight loss |
|---|---|
| (1) | 50 |
| (2) | 22 |
| (3) | 5 |

EXAMPLE 20

This is a comparative example which shows that the presence of poly(oxyethylene) units in a crystallizable compound containing ester units is insufficient to give a durable effect if the crystallinity is due solely to the poly(oxyethylene).

Samples of a 100% poly(ethylene terephthalate) taffeta were treated respectively with 20% solutions in water of poly(polyoxyethylene orthophthalate) and poly(polyoxyethylene terephthalate) as the padding bath in the process described in Example 8. The poly(polyoxyethylene orthophthalate) and poly(polyoxyethylene terephthalate) were prepared by ester interchange from poly(oxyethylene) glycol of average molecular weight 1500 with dimethyl orthophthalate and with dimethyl terephthalate using zinc acetate as catalyst in each case. The resulting polyesters had viscosity ratios (measured of 1% solutions in orthochlorophenol at 25° C.) of 1.36 and 1.91 respectively. The poly(oxyethylene) glycol used gave a viscosity ratio of 1.12. Both the polyesters crystallized on cooling; the crystallinity present was due to the poly(oxyethylene) segments, and the crystals melted at 39–42° C. and 37–38° C. respectively. In the case of both compounds, the treated, scoured, washed, and dried fabrics had no poly(oxyethylene) units on the surface, were not readily wetted by water, and developed electrostatic charge and soiled in the same way as untreated fabric.

These results show that the presence of poly(oxyethylene) units in a crystallizable material containing ester units is insufficient to give a durable effect if the crystallinity is due solely to the poly(oxyethylene) segments.

EXAMPLE 21

This is a comparative example showing that the treatment is not effective when the repeating units causing crystallinity in the compound used for the treatment (in this case, ethylene terephthalate units) are not the same as the units producing crystallinity in the article treated (in this case, hexamethylene adipamide units).

Example 11 was repeated using a 100% poly(hexamethylene adipamide) i.e. 6,6 nylon, plain weave taffeta. The treated fabric was subjected to 10 wash-dry cycles as described in Example 8, and then rinsed in water of conductivity $1.5 \times 10^{-3}$ mhos, spin-dried for 2 minutes, and tumble-dried at 60° C. The lengthwise resistance of a sample 7" x 1½" at 65% relative humidity was $7.5 \times 10^6$ megohms. The fabric developed electrostatic charge in the same was as untreated fabric, thus illustrating that the treatment is not effective when the repeating units causing crystallinity in the compound used for the treatment (in this case, ethylene terephthalate units) are not the same as the units producing crystallinity in the article treated (in this case, hexamethylene adipamide units).

EXAMPLE 22

Example 12 was repeated using a woven fabric comprising 55% poly (1,4-bis methylene cyclohexane terephthalate) fibers and 45% wool. The treated fabric was subjected to 10 wash-dry cycles and conditioned as in Example 8; the electrical resistance was $3.2 \times 10^6$ megohms. The fabric was difficult to wet by water and soiled in the same way as untreated fabric, thus illustrating that the treatment is not effective when the repeating units causing crystallinity in the compound used for the treatment (in this case, ethylene terephthalate units) are not the same as the units producing crystallinity in the article treated (in this case, 1,4-bis methylene cyclohexane terephthalate units).

What is claimed is:

1. A self-stable aqueous dispersion comprising water and a water insoluble crystallizable block or graft polymeric compound which contains essentially linear polyethylene terephthalate segments having sufficient ethylene terephthalate units to confer crystallinity on the compound and polyoxyethylene terephthalate units, said compound containing 10–50% by weight ethylene terephthalate units together with 50–90% by weight polyoxyethylene terephthalate units, the polyoxyethylene units having an average molecular weight of 1,000 to 4,000, the molar ratio of ethylene terephthalate to polyoxyethylene terephthalate units being 2:1 to 6:1 and the viscosity ratio of the copolymer being between 1.10 and 1.50 and the melting point measured by the temperature of disappearance of birefringence, being above 100° C. said polymeric compound being further characterized by being capable, on removal by evaporation of the water, of forming a durable surface modification on a polyethylene terephthalate shaped article, when heated in intimate contact therewith, said dispersion being free of added dispersing agent.

References Cited

UNITED STATES PATENTS

| 2,634,245 | 4/1953 | Arnot | 260—29.2 |
| 3,310,512 | 3/1967 | Curtice | 260—29.2 |
| 3,223,659 | 12/1965 | Curtice et al. | 260—29.2 |
| 3,329,557 | 7/1967 | Magat et al. | 260—860 |
| 3,355,413 | 11/1967 | Kiefer | 260—860 |

JOHN C. BLEUTGE, Primary Examiner

U.S. Cl. X.R.

8—55, 115.6; 117—118, 138.8, 139.5, 161; 260—75, 860